US007835933B2

(12) United States Patent
Casati et al.

(10) Patent No.: US 7,835,933 B2
(45) Date of Patent: Nov. 16, 2010

(54) METHOD AND SYSTEM FOR EVENT MANAGEMENT IN BUSINESS PROCESSES

(75) Inventors: Fabio Casati, Palo ALto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1424 days.

(21) Appl. No.: 10/118,815

(22) Filed: Apr. 8, 2002

(65) Prior Publication Data

US 2003/0191679 A1 Oct. 9, 2003

(51) Int. Cl.
*G05B 19/418* (2006.01)
(52) U.S. Cl. .......................................................... 705/8
(58) Field of Classification Search ...................... 705/8
See application file for complete search history.

(56) References Cited

U.S. PATENT DOCUMENTS

| | | | | | |
|---|---|---|---|---|---|
| 5,826,239 | A | * | 10/1998 | Du et al. | 705/8 |
| 5,870,545 | A | * | 2/1999 | Davis et al. | 709/201 |
| 6,041,306 | A | * | 3/2000 | Du et al. | 705/8 |
| 6,567,783 | B1 | * | 5/2003 | Notani et al. | 705/9 |
| 6,578,006 | B1 | * | 6/2003 | Saito et al. | 705/9 |
| 6,968,335 | B2 | * | 11/2005 | Bayliss et al. | 1/1 |
| 7,092,984 | B2 | * | 8/2006 | Nishigaya et al. | 709/201 |
| 7,152,204 | B2 | * | 12/2006 | Upton | 715/513 |
| 7,152,229 | B2 | * | 12/2006 | Chong et al. | 717/146 |
| 2002/0010803 | A1 | * | 1/2002 | Oberstein et al. | 709/318 |
| 2002/0138287 | A1 | * | 9/2002 | Chen et al. | 705/1 |
| 2002/0170035 | A1 | * | 11/2002 | Casati et al. | 717/127 |

FOREIGN PATENT DOCUMENTS

JP 2000187624 A * 7/2000

OTHER PUBLICATIONS

Casati, Fabio, Models, Semantics, and Formal Methods for the Design of Workflows and Their Exceptions Politencio Di Milano, Ph. D. Thesis, 1998.*
Malan, Robert G. et al., eFlow: A Java-Based Workflow Service WIAOOWMS98, 1998.*
Casati, Fabio et al., Adaptive and Dynamic Service Composition in eFlow HP Laboratories, HPL-2000-39, Mar. 2000.*
Casati, Fabio et al., eFlow: a Platform for Developing and Managing Composite e-Services HP Laboratories, HPL-2000-36, Mar. 2000.*
Casati, Fabio et al., An Open, Flexible, and Configurable System for Service Composition Workshop on Advanced Issues of E-Commerce and Web/based Information Systems, IEEE 2000.*

(Continued)

*Primary Examiner*—Scott L Jarrett

(57) ABSTRACT

An event management method for a computer implemented business process system. The method includes the step of executing a plurality of events for representing a business process, the business process implemented by progressing through the events. A plurality of event nodes are executed for the business process, the event nodes defining points in the progress of the business process for communicating with an external process to exchange information. The business process is executed by sequentially executing the events, wherein the execution proceeds in accordance with the event nodes.

26 Claims, 7 Drawing Sheets

OTHER PUBLICATIONS

Luckham, David et al., An Event-Based Architecture Definition Language IEEE Transactions on Software Engineering, vol. 21, No. 9, 1995.*

Shan, Ming-Chien et al., HP Workflow Research: Past, Present and Future HP Laboratories, HPL-97-105, Aug. 1997.*

Geppert, Andreas et al., Event-based Distributed Workflow Execution with EVE Technical Report 96.05, Mar. 1998.*

Ender, Johann et al., Towards Distributed Workflow Process Management WACC Workshop on Cross Organizational Workflows, Feb. 1999.*

Georgakopoulos D et al., Managing Process and Service Fusion in Virtual Enterprise Information Systems, vol. 24, No. 6, Sep. 1999, Abstract.*

Hagen, Claus et al., Beyond the Black Box: Event-based Inter-Process Communication in Process Support Systems 19$^{th}$ Int'l Conference on Distributed Computing, 1999.*

Chen, Qiming et al., Multi-Agent Cooperation, Dynamic Workflow and XML for E-Commerce Automation HP Laboratories, HPL-1999-136, Oct. 1999.*

Casati, Fabio, Semantic Interoperability in Interorganizational Workflow Proceedings of the Workshop on Cross-Organizational Workflow Management and Coordination, Feb. 1999.*

Lazcano A. et al., The WISE approach to Electronic Commerce Swiss Federal Institue of Technology, May 26, 2000.*

Casati, Fabio et al., Modeling and Managing Interactions among Business Processes Nov. 30, 2000.*

Casati, Fabio et al., Supporting Workflow Cooperation Within and Across Organizations SAC'00, ACM, Mar. 2000.*

Dayal, Umeshwar et al., Business Process Coordination: State of the Art, Trends and Open Issues Proceedings of the 27$^{th}$ VLDB Conference, 2001.*

Casati, Fabio et al., Event-Based Interaction Management for Composite E-Services in eFlow Information Systems Frontiers, vol. 4, No. 1, Apr. 2002, pp. 19-31.*

Barrett, Daniel J. et al., A Framework for Event-Based Software Integration ACM Transactions on Software Engineering and Methodology, vol. 5, No. 4, Oct. 1996, pp. 378-421.*

Cugola, Gianpaolo et al., The JEDI Event-Based Infrastructure and Its Application to the Development of the OPSS WFMS IEEE Transactions on Software Engineering, vol. 27, No. 9, Sep. 2001.*

Level 8 Systems Ships Enhanced Version of EventWorks PR Newswire, Apr. 22, 1998.*

Casati, Fabio et al., Specification and Implementation of Exceptions in Workflow Management Systems ACM Transactions on Database Systems, vol. 24, No. 3, Sep. 1999, pp. 405-451.*

Carzaniga, Design and Evaluation of a Wide Area Event Notification Service ACM Transactions onf Computer Systems, vol. 19, No. 3, Aug. 2001, pp. 332-383.*

Menh, Jie, Achieving Dynamic Inter-Organizational Workflow Management by Integrating Business Processes, E-Services, Events and Rules, University of Florida, 2002, UMI No. 3052362.*

Kamath, Mohan Umesh, Improving Correctness and Failure Handling in Workflow Management Systems University of Massachusetts Amherst, May 1998.*

* cited by examiner

METHOD AND SYSTEM FOR EVENT MANAGEMENT IN BUSINESS PROCESSES

TECHNICAL FIELD

The present invention relates generally to electronic commerce information technology. More specifically, the present invention pertains to an electronic commerce information management system for delivering business data and services.

BACKGROUND ART

The use of the Internet for electronic commerce and for information retrieval has rapidly proliferated in today's modern world. Hundreds of Internet sites and Web portals are constantly accessed by millions of users for obtaining information, news, entertainment, and the like, via the World Wide Web. Many aspects of everyday life are becoming electronically information based, and the access, control, and the use of such electronic information, through the use of various types of electronic devices, is never far from hand. For example, a desktop computer allows access to banking functions (e.g., checking, bill paying, etc.), shopping (e.g., groceries, clothing, etc.), the weather, and virtually any other need of an individual.

As described above, the emergence of the Internet is changing many aspects of modern life. However, no area is undergoing as rapid and significant changes as the manner in which businesses operate. Today, large and small companies are using the Web to communicate with their partners, to connect with their back-end systems, and to perform electronic commerce transactions. Users will soon witness the evolution of today's e-business and e-commerce into e-services. Examples of e-services are stock trading, customized newspapers, real-time traffic report, or itinerary planning.

The e-service environment creates the business opportunity for providing value-added services, which are delivered by composing existing e-services, possibly offered by different providers. For instance, an "eMove" composite service could support customers for relocations, by composing truck rental, furniture shipments, address change, and airline reservation services in a flexible way to meet various needs for each relocation transaction. Hence, the Web is rapidly becoming the platform through which many companies deliver e-services to businesses and individual customers. E-Services are typically delivered in their primitive forms, called basic services.

Prior art traditional approaches to service composition allow the definition of a composite service as a business process, specified by a graph of nodes (corresponding to activities or services to be executed). In such models, new services are started as other services complete, according to the control flow specifications. However, many processes need to synchronize the activations of their nodes with the occurrence of specific events. For instance, in a candidate interview process, suitable actions must be performed when the candidate decides to withdraw his/her job application: reservations for interview rooms need to be canceled, e-mails need to be sent to the members of the interview team, and the withdrawal need to be logged in the corporate Human Resource database. The withdrawal of a job application is asynchronous with respect to the activities in the candidate interview process, that is, it does not necessarily occur in correspondence to the completion of a process activity, but can instead occur at any time during process execution. To specify this kind of behaviors, a composition model should provide primitives that enable the definition of paths in the process that are activated as a given event occurs.

In addition, events can also provide for dynamic data exchange between composite services and external applications. For instance, consider a car rental process. This process needs to manage situations in which an accident occurs to the rented car. If the process model and system can manage events, then the process designer can specify suitable actions to be taken as a car accident event is detected. In addition, this event may carry some parameters, such as the car license plate number or the time needed for repair. These data can be made accessible to the process instance in order to react appropriately to the situation.

Depending on the type of events supported by the process model, the specifications of many other behaviors become possible: for instance, events could be used to synchronize the execution of activities executed in two (or more) different process instances, to suspend the execution of a process until a given date and time, to define processes whose instances are created periodically or as a given event occurs, to detect and react to manipulations of a given process variables, to handle exceptional situations such as the inability to invoke a service, and many others.

There currently exists no comprehensive model or architecture that enables the delivery of such value-added services. There exists no solution that supports the specification, deployment, and management of composite e-services, i.e., of e-services that are carried out by invoking several other basic or composite services. There exists no solution that provides the service developer with a simple, easy to use, yet powerful mechanism for defining services. The present invention provides novel solution to the above requirements.

SUMMARY OF THE INVENTION

In one embodiment, the present invention is implemented as an event management method for a computer implemented business process management system. The method includes the step of executing a plurality of events representing aspects of a business process. The business process is implemented by progressive execution through the events. A plurality of event nodes for the business process are executed. The event nodes define points in the progress of the business process for communicating with an external process to exchange information.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the embodiments described below, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide a comprehensive model and architecture that enables the delivery of value-added E-business services by extending traditional composition model with a rich and flexible event model. Embodiments of the present invention provide a solution that supports the specification, deployment, and management of composite e-services, i.e., of e-services that are carried out by invoking several other basic or composite services. Embodiments of the present invention is a solution that provides the service developer with a simple, easy to use, yet powerful mechanism for defining services by composing basic ones.

For example, in one embodiment, an event management method for a computer implemented business process system is implemented. The method includes the step of providing a plurality of events (and other steps) for representing many aspects of a business process, the business process implemented by progressing through the events sequentially, in parallel, or conditionally. A plurality of event nodes are provided for the business process, the event nodes defining points in the progress of the business process for communicating with an external process to exchange information or to synchronize the execution. The business process is executed by executing its steps, which may include event nodes. Events can be classified into state change events, error events, application events, and temporal events. The event nodes can be request nodes and publish nodes. The computer implemented process and even definition can be XML (extensible markup language) based.

Figure 1:
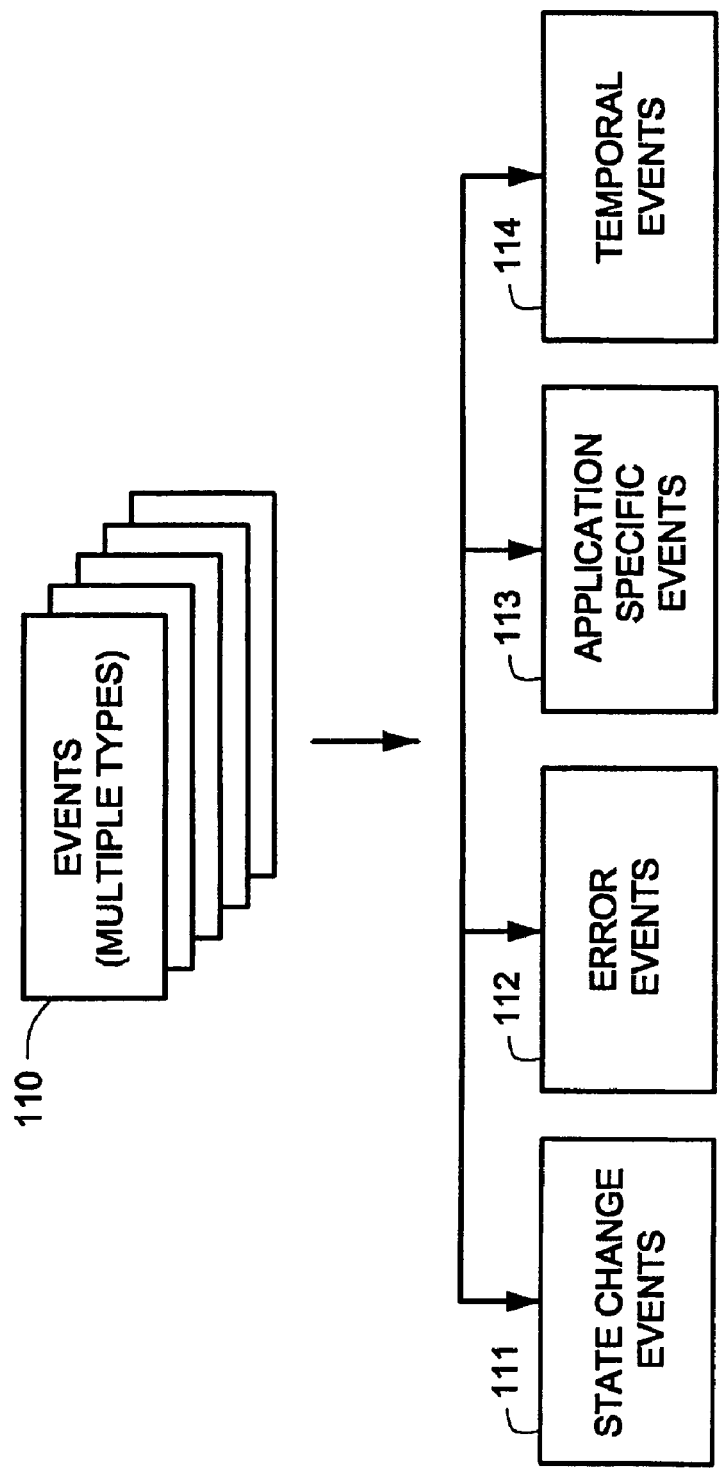
FIG. 1 shows a diagram depicting different types of events in accordance with one embodiment of the present invention.

FIG. 1 shows a diagram depicting different types of events in accordance with one embodiment of the present invention. Embodiments of the business management process provides advantages by, for example, defining a set of event classes, or types, that are of interest in the context of business process management. As depicted in FIG. 1, a set of event types 100 can be further subdivided into more specific types of events. For example, as will be described in greater detail below, events can be classified into: state change events 111, error events 112, application events 113, and temporal events 114. For each of the multiple event types 100, parameters are identified that events of that class should have, when events are raised, and by whom. The embodiments of the present invention are also compatible with an XML-based syntax to specify the behavior of publish and request event nodes.

Additionally, embodiments of the present invention implement a notion of temporal events 114, wherein temporal events can be handled in the same fashion as other types of events, thereby simplifying event management in business processes. Symbolic dates are a specific type of temporal event 114. Symbolic dates are implemented for such artificial dates such as "Pay-Day", or "Easter", or "Thanksgiving" etc.

Referring still to FIG. 1, embodiments of the present invention utilize the multiple event types 100 to enable the delivery of value-added services by, for example, implementing a model and architecture that supports the specification, deployment, and management of composite e-services, i.e., of e-services that are carried out by invoking several other basic or composite services. The event management functionality of the embodiments utilize the multiple event types 100 to provide the service developer with a simple, easy to use, yet powerful mechanism that extends traditional mechanisms for defining services by composing basic ones.

Embodiments of the present invention allows the definition of a composite service as a business process, specified by a graph of nodes (corresponding to activities or services to be executed) which link together a series of, for example, state change events 111, error events 112, application specific events 113, and temporal events 114. In such models, new services are started as other services complete, according to the control flow specifications. Additionally, embodiments of the present invention provide for the synchronization of the activation of multiple processes and their respective nodes with the occurrence of specific events.

Referring still to FIG. 1, in the embodiments of the invention described below, the different types of events 100 relevant in the context of service composition, and the approach to event management is described. Classes of events 100 are defined with respect to the manner in which they are handled by embodiments of the invention, and characteristics of events in each class (e.g., classes 111-114) are described. One objective of the embodiments of the event model and language has been that of making the specifications of the event to be sent or received as simple as possible. Preferably, events 100, regardless of their type, are specified in a uniform fashion, using the same formalism and the same underlying basic concepts, so that the process designer does not need to learn different languages to specify different kinds of events. High-level constructs can be provided, especially in the critical area of time management, to further simplify event handling.

In accordance with embodiments of the present invention, a composite service refers to a workflow process that composes other basic or composite services. A process can be modeled by a graph (e.g., FIG. 2), which defines the order of execution among the nodes in the process. The graph may include service, decision, and event nodes. Service nodes represent the invocation of a basic or composite service, decision nodes specify the alternatives and rules controlling the execution flow, while event nodes enable service processes to send and receive several types of events.

A process instance is an enactment of a process definition. The same process may be instantiated several times, and several instances may be concurrently running. Service nodes can access and modify data included in process variables. Each process instance preferably has a local copy of these variables, and embodiments of the present invention controls access to these data.

Different types of events 100 in accordance with embodiments the present invention are now described. Embodiments of the present invention can capture and manage several different types of events. Some of them are used for exception handling purposes, some for time-based synchronization of service execution, other for synchronization and dynamic data exchange with other services, and other again to monitor service state changes and react appropriately. Preferably, events can carry parameters. Different types of events have different parameters (although a few parameters are common across all event types).

One type of event is a state change event 111. State change events 111 are raised by changes in the process instance state. This includes the execution state of nodes and process instances as well as the value of process variables. For instance, in a bank account management process, actions may need to be taken when the value of process variable balance goes below a threshold. Events of interest can be restricted to a specific node, process instance, or process definition, or they can be unrestricted (capturing every state change).

It should be noted that the term "process", "workflow", and "composite service" are used synonymously. Additionally, it should be noted that an instance of a process refers to the execution of a process.

State-change events 111 preferably have the following parameters:

Event type: every type of event has an event type parameter. For all state change events, its value is set to "state_change".

Variable name: the name of the variable that changed value or, if the event is related to a node state change, the name of the node that changed state.

Old value: the value of the variable prior to the modification (or the state of the node prior to the change)

New value: the value of the variable after the modification, or the new state of the node Process definition id: the identifier of the process definition to which the modified process instance belongs to.

Process instance Id: the identifier of the process instance in which the state change occurred Occurrence time: the date and time of the event occurrence.

Error events 112 are notifications of run-time errors occurred during process execution, such as when no service can be selected to execute a node. As for the previous type, events of interest can be restricted to those caused by a specific node, process instance, or process definition, or they can be unrestricted.

Preferably, error events 112 have the following parameters:

Event type: For all error-handling events, its value is set to "error".

Node name: the name of the node to which the error event is related. If the error is related to a process instance rather than to a node, this parameter has a NULL value.

Process definition id: the identifier of the process definition to which the affected node or process instance belongs.

Process instance Id: the identifier of the process instance to which the event is related Error type: a string defining the type of error notified by this event.

Occurrence time: the date and time of the event occurrence.

Application-specific events 113 do not have a predefined semantics; they are qualified by their name, may carry several parameters, and are explicitly notified to the process engine by another process or by external parties. For instance, the customer Cancel event in a travel reservation process might represent the situation in which the customer cancels his/her travel reservation. The candidate withdrawal event introduced above is also an example of application-specific event.

Application-specific events 113 may carry an arbitrary number of parameters. The only event parameters common to all application-specific events 113 (besides the name) are the occurrence time and the event type, with the same semantics as above.

Temporal events 114 are raised at specified points in time. Embodiments of the present invention can detect and raise three types of temporal events 114:

Instant: the event is raised only once, at a specified date and time.

Usually, the date and time are specified by providing the time of the day, plus the day, month, and year. Embodiments of the present invention also allows the definition of symbolic dates such as Christmas, Easter, or Thanksgiving, as discussed below.

Periodic: these events are raised periodically. The periodic event language allows the specification of simple periodic intervals (e.g., "every 3 hours") as well as the definition of expressions that have knowledge of the calendar, such as "every Monday at 2pm", "every US election day at noon", or "on the 28th day of each month".

Interval: interval events are raised as a given interval has elapsed since a base event (e.g., 20 minutes after the activation of the task, or 2 days after the car accident). The base event can be an error, state-change, application-specific, temporal/instant, or temporal/periodic event.

Preferably, all temporal events have parameters occurrence time and event type.

Figure 2:
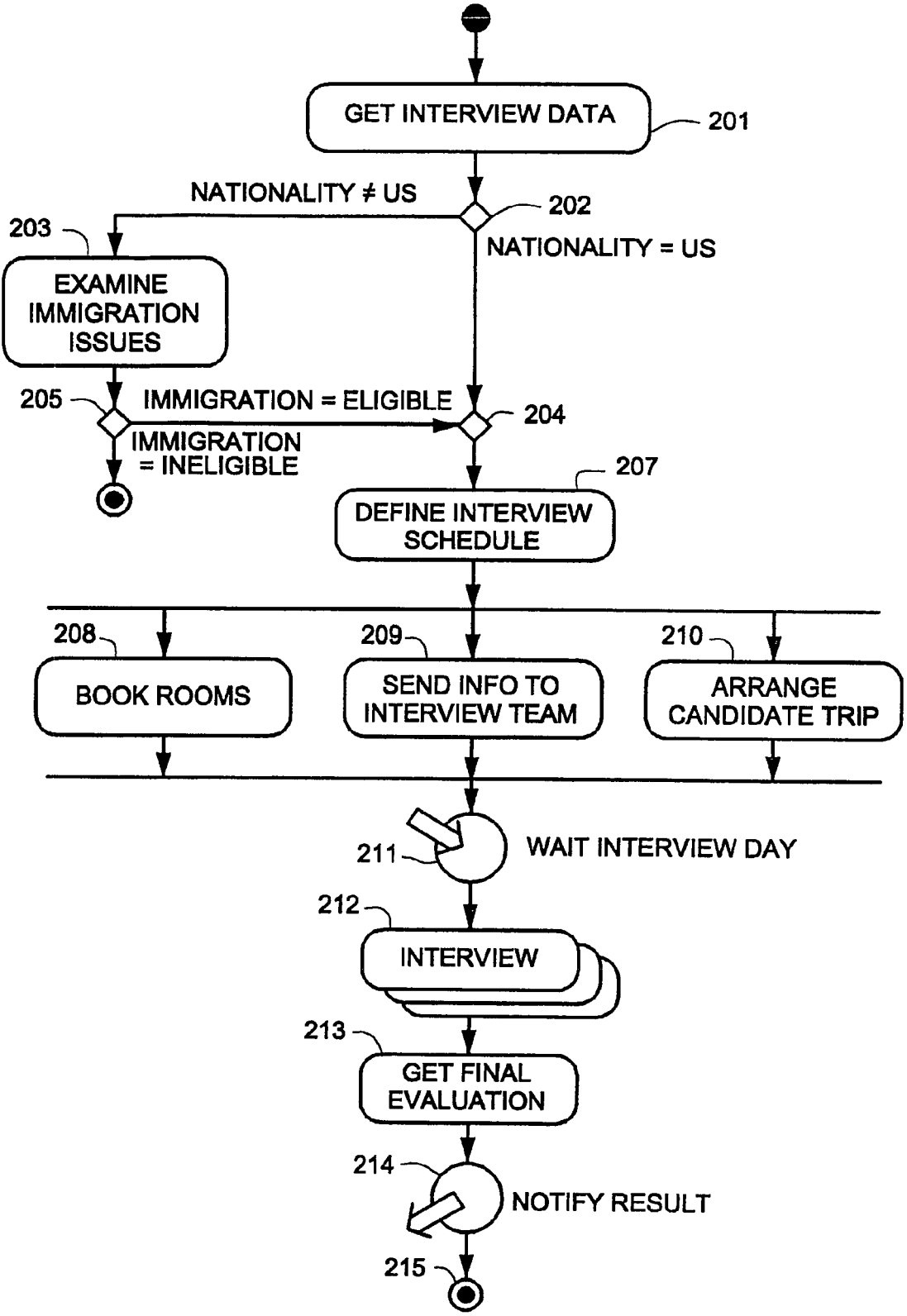
FIG. 2 shows a flow chart of the steps of a process in accordance with one embodiment of the present invention.

FIG. 2 shows a flow chart of the steps of a process 200 in accordance with one embodiment of the present invention. Process 200 depicts the steps involved in a candidate interview process as managed by one embodiment of the present invention. Although process 200 is described in the context of a candidate interview process, it should be noted that a number of different types of workflows can be implemented and automated with embodiments of the event management process of the present invention.

Referring still to FIG. 2, the steps 201-215 describe a candidate interview process. As depicted in FIG. 2, lozenges represent service nodes (e.g., steps 201, 203, 207, 208, 209, 210, 212, and 213), circles with incoming/outgoing arrows represent event nodes (e.g., step 211 and step 214), while the other symbols represent decision nodes.

Process 200 begins in step 201, as when a new instance of the process 200 is invoked by a candidate applying for employment. In step 201, service Get Interview data is invoked to collect information regarding the candidate, the interview team, and a set of possible interview dates. Then, in step 202, if the candidate is a foreigner, process 200 proceeds to step 203, where a lawyer analyzes his/her immigration status to determine whether the candidate can work in the US (or is likely to be able to get a visa) or not. If not, the hiring manager is informed and the process 200 terminates. Otherwise, process 200 proceeds to step 204 and 207, where an administrative assistant defines the interview schedule, according to the schedule and availability of the interview team members. After the schedule has been fixed, three services are invoked in parallel: "Book rooms" (e.g., step 208) will book conference rooms according to the schedule provided. "Send info to interview team" (e.g., step 209) will send the candidate's curriculum information to the team members. Finally, "Arrange candidate trip" (e.g., step 210) is executed by a company travel agent and will take care of verifying the candidate's need in terms of travel tickets, hotels, and car, for a three-day period centered on the interview day.

Referring still to FIG. 2, after steps 208-210, no action needs to be taken until the interview date. In step 211, this is modeled by the event node "wait interview date", that will let the flow of process 200 proceed only at the specified interview day. The event node in step 211 is followed by the parallel activation of several services in step 212 (one for each member of the interview team), that will collect feedback from every interview team member. The parallel activation of several instances of the same service of step 212 is modeled in the present embodiment by a Multiservice node. Finally, in step 213, as all inputs have been gathered, the hiring manager makes the final decision. An event node in step 214 notifies the final decision to all other interested processes and/or services, that will take care of performing the appropriate actions (e.g., start the hiring process or notify the candidate about the rejection). Process 200 subsequently ends in step 215.

Thus, in the Candidate Interview example of process 200 above, multiple event types (e.g., as shown in FIG. 1) are used to synchronize the execution of the multi-service interview so that it starts on the appropriate date and to publish the result to any interested party. Achieving these (and many other) behaviors without an integrated event management process would be unduly hard and time-consuming.

Figure 3:
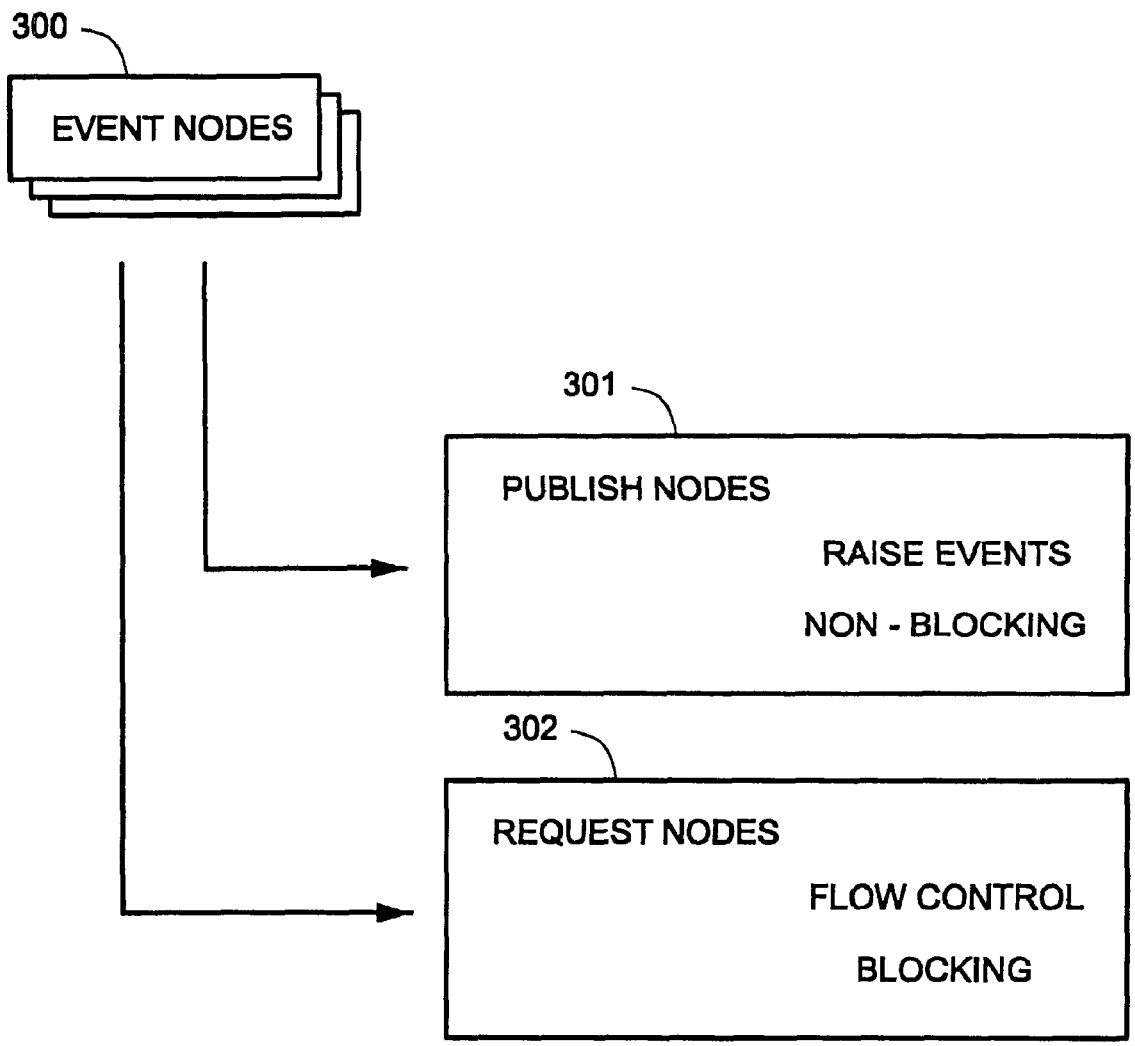
FIG. 3 shows a diagram depicting the different types of event nodes in accordance with one embodiment of the present invention.

Referring now to FIG. 3, a diagram depicting the different types of event nodes 300 in accordance with one embodiment of the present invention is shown. The description of FIG. 3 below describes the manner in which composite services can publish or receive events. In the embodiments of the present invention, points in process execution where events should be sent or received are specified by means of event nodes, e.g., event nodes 300. There are preferably two types of event nodes: Publish nodes 301 and Request nodes 302. Publish nodes 301 raise an event, which can be notified to other process instances or to other, external parties. Publish nodes 301 are non-blocking: as the event is notified, process execution proceeds immediately by activating the subsequent node.

As shown in FIG. 3, request nodes 302 correspond instead to requests of events. Request nodes 302 are blocking: as a request node 302 is reached in the control flow of a given process instance, the flow (along the path where the request node 302 is defined) stops until an event with the specified characteristics is delivered to that node.

Publish nodes 301 denote points in the flow where a process notifies and communicates with an application-specific event. The specification of a publish node 301 includes the definition of the event to be generated, described in one embodiment by an XML string. In particular, a set of <name, value>pairs specifies the event parameters. Values may be defined by constants or may refer to the name of a process variable, meaning that the actual value of the parameter is set to the value of process variable at the time the event node is executed.

For example, the candidate interview process 200 described above publishes an event notifying the interview result (to be captured by all other defined services interested in this event). Assume also that the event must indicate the name of the candidate, the evaluation result, and the interview date. In one embodiment, such a node can be specified as follows:

```
<PUBLISH_NODE ID="Interview_Result">
    <NAME> Interview Result </NAME>
    <EVENT_PARAMETER>
        <PAR_NAME> candidate_name </PAR NAME>
        <VALUE> $CandidateInfo.Name </VALUE>
    </EVENT_PARAMETER>
    <EVENT_PARAMETER>
        <PAR_NAME> result </PAR_NAME>
        <VALUE> $Decision </VALUE>
```

-continued

```
    </EVENT_PARAMETER>
</PUBLISH NODE>
```

In the above example, event parameters "candidate_name" and "result" are set by means of process variables.

A publish node 301 can restrict the target processes or service that can receive the event. Possible restrictions, specified by means of the <RESTRICT TO> tag, include process (only other instances in the same process can receive the event), group (only processes of the same group can receive the event), system (only process executed by the same engine can receive the event), or all (every body, including external process execution, can receive the event—This is the default).

Request nodes 302 denote points in a process where the execution is suspended (along the path where the event node is defined), waiting for an event to be delivered. In one embodiment, each request node 302 execution can receive at most one event. In order for a node to request another event, the node must be fired again. As the event is delivered to the request node 302, process instance execution proceeds with the activation of the node connected in output to the request node 302. Preferably, embodiments of the present invention do not require events to have a name. If defined, event names such as InterviewResult are handled like any other parameter.

Figure 4:
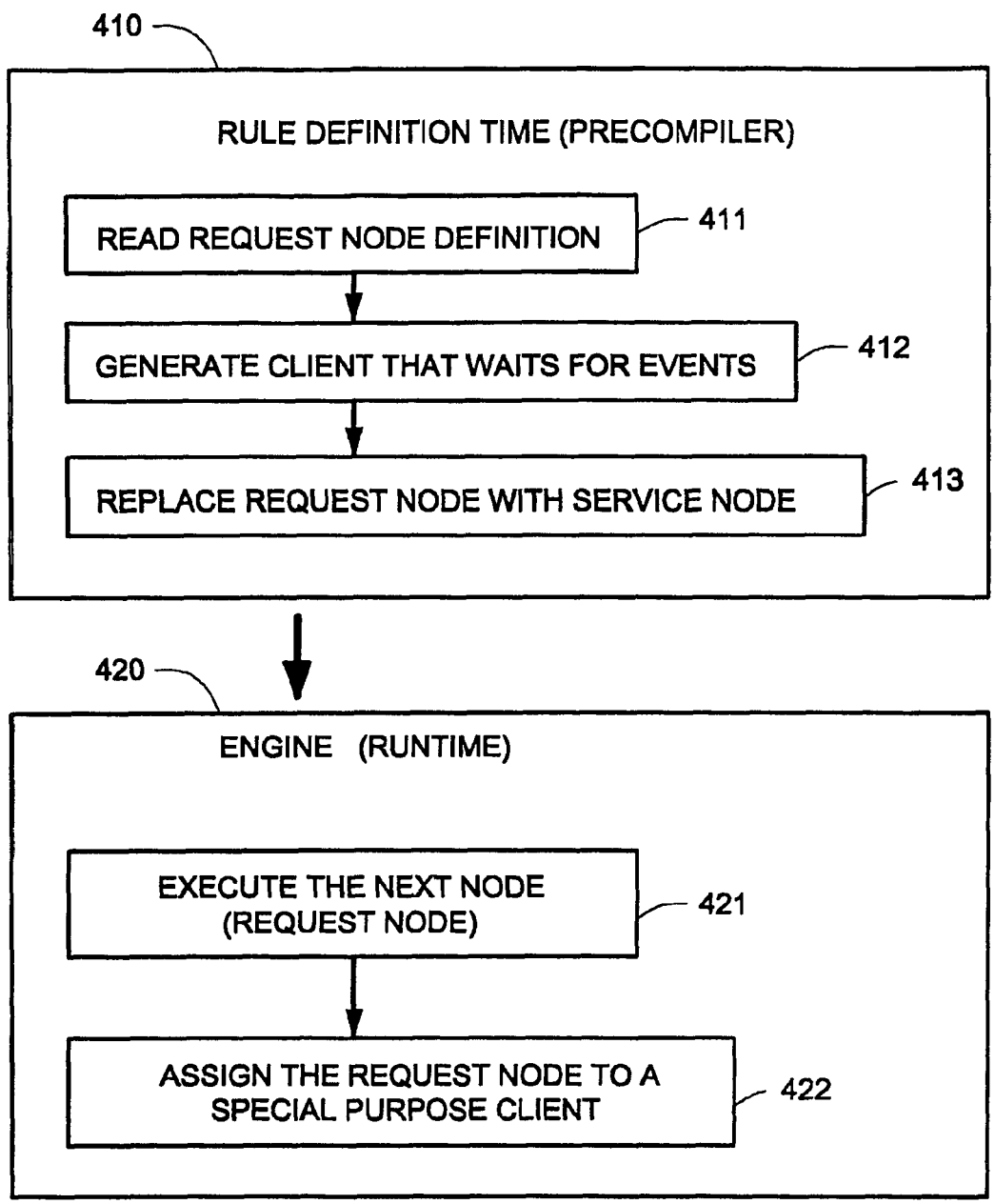
FIG. 4 shows the basic architecture of a business management process in accordance with one embodiment of the present invention.

FIG. 4 shows the basic architecture of a business management process in accordance with one embodiment of the present invention. As shown in FIG. 4, the functionality comprising the business management process of the present embodiment occurs primarily at either pre-compile time (rule definition time 410), or engine execution (runtime 420). At rule definition time 410, the various software-defined parameters and information describing a business process (e.g., business process 200 of FIG. 2) are ordered and configured to implement the particular business management process of interest to a user. This includes, for example, reading request node definitions 411, generating one or more clients that wait for the occurrence or fulfillment of certain events 412, and replacing various request nodes with service nodes 413 (e.g., for blocking conditions not applicable to the particular business management process).

At runtime 420, the engine executes the software managing the business process. For example, during the execution, successive nodes are executed 421. Designated request nodes are assigned to special purpose clients to request information (e.g., provide an input to the process). Depending upon the specific rules in place for the particular process, specific next nodes are requested and executed (request node 421) and subsequent request nodes are used, for example, to obtain information from other parties involved in the business process. In this manner, the rules influence the progression and result of the business process.

Preferably, for each request node 422, the process designer specifies a request rule that defines the kind of events the node is interested in (specified by a filtering rule) and the event data that should be captured within process variables (specified by a capturing rule). The filtering rule is mandatory, while the capturing rule must be specified only if the requesting process needs to capture event data into local process variables. These components are described in greater detail below.

Filtering rules in accordance with the present embodiments are now described. Different event languages may have different expressive power in defining and capturing the events of interest among those of a given type. For instance, consider the problem of defining the application-specific events that a process needs to monitor. Simple event languages could allow the indication of the event of interest by specifying the event name, such as car accident. However, more sophisticated functionality is often needed. For instance, the process designer may need to specify interest in events related to car accidents for a car of a given brand or with a given plate number, not just in any car accident. Indeed, a process instance is only interested in car accident events related to the car that the instance is managing, not in every car accident event. Having every process receive and manage any car accident event would be burdensome both from a process design and from a system perspective. Hence, an advanced event language could allow the use of a finer granularity in specifying the events of interest, by defining constraints over event parameters, that is, by defining an event filtering condition.

Preferably, the event filter may be defined in terms of constant values or in terms of references to process variables. For instance, the plate number of interest could be given as a constant or it can be a reference to a process variable, so that each process instance can receive a different event, and exactly the event that is relevant to that instance.

As another example of frequently needed functionality that goes beyond what provided by simple name-based event matching, consider the case in which a process wants to be notified when a temporal/instant event occurs, in which the date and time are not fixed beforehand, but can be defined during process instance execution, and indeed can differ from instance to instance. The timestamp could be specified as a reference to a process variable (of the type timestamp) rather than being a constant value: in this way the timestamp to be monitored can be set on a per-instance basis by a previously executed service node.

Referring still to FIG. 4, with request node definition (e.g., request node definition 411), a filtering rule in a request node defines the characteristics of the events that the node is interested in receiving. Generally, request nodes can be defined to request error, state change, temporal, or application-specific events. Preferably, all event types are specified using the same formalism: the event of interest is simply defined by a Boolean condition over event parameters and process variables. Typically, the condition compares event parameters with constants or with the value of process variables to check if these values match. At runtime 420, when a request node is reached by the control flow (i.e., it is fired), process variables present in the filtering rule are replaced with their current value, and a request for the event of interest is issued. The embodiments of the present invention will deliver to the node the first event that satisfies the condition and that occurred after the request node activation (hence, events are not cached).

Examples of filtering rules for the different event types are now provided.

Error events: Assume that the designer wants to specify a request node that captures errors related to XOR decision nodes (that is, a decision node that should activate one and only one output path), executed in the same instance, whose rule activate multiple output paths. This semantics can be achieved in fellow by specifying a request node as follows:

```
<REQUEST_NODE D="catch_xor_errors">
    <NAME> Catch Xor Errors </NAME>
    <FILTER event_type="error">
        error_type="xor_multipleoutput" and
        process_instance_id=$proc_inst_id
```

```
    </FILTER>
</REQUEST_NODE>
```

Note the constraint on the process instance parameter, which limits the event of interests to those occurring within the same process instance ("$proc_inst_id" is a predefined, read-only process variable, automatically maintained by the system, that contains the process instance identifier). If we are instead interested in capturing this event for any instance of the "candidate interview" process, then we can specify the following node:

```
<REQUEST_NODE ID="catch_xor_errors">
    <NAME> Catch Xor Errors </NAME>
    <FILTER event_type="error">
        error_type="xor_multiple_output" and
        process_definition_id= "candidate_interview"
    </FILTER>
</REQUEST_NODE>
```

State change events: State change events of the present embodiments are specified in the same fashion as error events. The designer specifies the event type (event type="state_change") and the other parameters on which he/she wants to put constraints in defining the event of interest. For instance, suppose that in a bank account management process, a request node monitors variable balance in order to check when it turns from a positive to a negative value. This node can be specified as follows:

```
<REQUEST_NODE ID="catch_negative_balance">
    <NAME> Catch Negative Balance </NAME>
    <FILTER event_type="state_change">
        variable_name="balance" and old value >0 and new
        value <0
    </FILTER>
</REQUEST_NODE>
```

The following node monitors instead every negative variation of the balance:

```
<REQUEST_NODE ID="catch_negative_variations">
    <NAME> Catch Negative Variations </NAME>
    <FILTER event_type="state_change">
        variable_name="balance" and
        old value < new value
    </FILTER>
</REQUEST_NODE>
```

Application-specific events: In this type of events, all attributes (except the event type and the occurrence time) are event-specific. As an example of filtering rule on application-specific events, consider the candidate interview process, and assume that the process designer is interested in capturing events that denote that the candidate has withdrawn its application. We assume that this situation is described by an event whose name is Candidate Withdrawal and whose additional parameters are candidate_name (the name of the candidate), position (the code of the position for which he/she withdrew the application), and reason (the motivation for the cancellation, if provided).

In order to capture this event, the process designer can specify the following filtering condition:

```
<REQUEST_NODE ID="catch_Candidate_Withdrawal">
    <NAME> Catch Candidate Withdrawal </NAME>
    <FILTER event_type="application_specific">
        event_name="Candidate Withdrawal" and
        candidate_name=$candidateName and
        position=$advertisedPosition
    </FILTER>
</REQUEST NODE>
```

The above rule specifies that the event node is requesting an application-specific event named "Candidate Withdrawal", in which the value of parameters candidate_name and position equal the value of process variables candidateName and advertisedPosition at the time the request node is activated.

Temporal events: In principle, "capturing" temporal events should be different from capturing other event types. The purpose here is to specify interest in the occurrence of a given timestamp, and there is no "event" that is actually generated and that can be captured. However, to allow the specification of events of interest in a uniform fashion, we use a similar formalism for the specification of these events as well. In fact, the process designer may assume that, conceptually, embodiments of the present invention often raise a temporal event every second. This allows temporal events to be specified by a filter on the occurrence time parameter, by using a simple language that enables the definition of date-time, interval, and periodic times.

Figure 5:
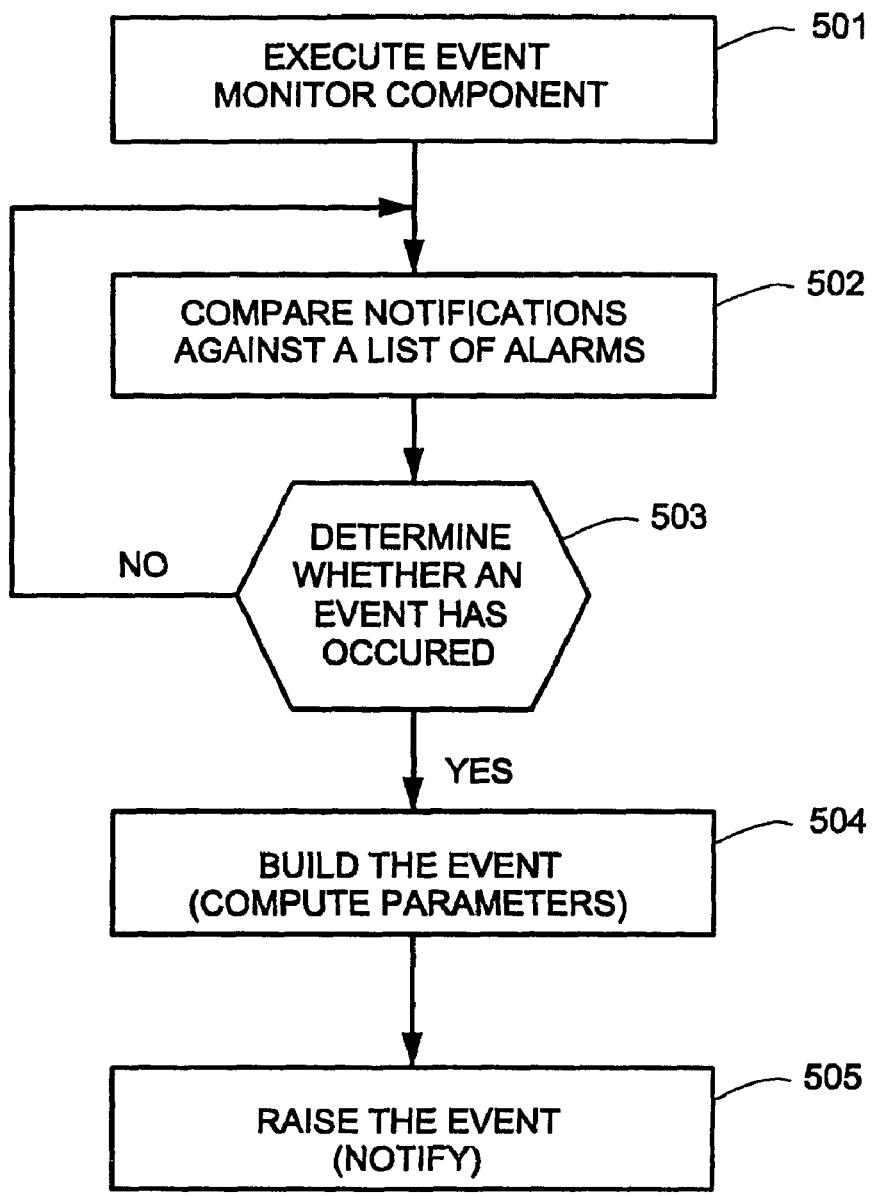
FIG. 5 shows a flow chart of the runtime execution of a typical temporal event in accordance with one embodiment of the present invention.

FIG. 5 shows a flow chart of the runtime execution of a typical temporal event in accordance with one embodiment of the present invention. In step 501, the runtime engine executes to monitor the progress of the business process. The runtime engine is referred to here as the event monitor component. In step 502, the event monitor component receives notifications, for example, from various clients or external processes, as the business process progresses. These notification are compared against a list of alarms. Subsequently, in step 503, a determination is made as to whether an event of this particular business process has occurred. If the notifications do not indicate an event occurrence, steps 502 and 503 are repeated, and the incoming notifications are continuously checked. If the one or more notifications indicates an event has occurred, step 504 is executed, where the event is built, wherein the event's parameters are computed. Then, in step 505, depending upon the particular rules in effect, a temporal event, in this case a notification event, is used to raise the event. This is the basic structure applicable to each of the event types as they are monitored by the monitor component.

Instant events: Instant events are specified by giving the timestamp at which the event should be raised. The time can be omitted, and it preferably defaults to 00:00:00. The date can be expressed in the yyyy-mm-dd format, or it can be a symbolic date, such as Thanksgiving or Christmas. Symbolic dates are discussed below. The timestamp can also be specified as a reference to a process variable. Preferably, only the equality operator can be used to define a constraint over the timestamp. For example, the request node Wait Interview Day of the Candidate Interview process can be specified as follows:

```
<REQUEST_NODE ID="On_InterviewDay">
    <NAME> On Interview Day </NAME>
```

-continued

```
    <FILTER event_type="temporal_instant">
        timestamp=$InterviewDay 9:00:00
    </FILTER>
</REQUEST_NODE>
```

Interval events: Interval events are defined by an interval and a base event. The event will be raised as the specified interval has elapsed since the specified base event. For instance, a node that request the event "A week after the candidate withdrawal" is specified as follows:

```
<REQUEST_NODE ID="catch_delay">
    <NAME> Catch delay </NAME>
    <FILTER event type= "temporal_interval"> interval= 7
        00:00:00
    </FILTER>
    <BASE_EVENT>
    <FILTER event_type=application_specific">
        event_name="candidate Withdrawal" and candidate
        name=$candidateName and
        position=$advertisedposition
    </FILTER>
    </BASE_EVENT>
</REQUEST_NODE>
```

The interval is preferably specified in the format dd hh:mm:ss. Intervals in terms of months and years cannot be specified, since the length of months and years may vary, and it would therefore be undetermined. As usual, the interval may be defined by a process variable instead of being hard-coded into the node.

Note that the request also includes the specification of the base event, that may include references to process variables. Hence this request node is actually monitoring two events, both of which may include references to process variables. To avoid ambiguities, define a clear semantics, and maintain a consistent behavior among request nodes, the value of process variables is preferably determined as the node is started, and the interval is computed starting from the first base event received after the node is started. Subsequent events matching the base event filter criteria are disregarded.

Periodic events: Periodic events can be specified by providing the base time that defines when the first of the (potentially infinite) series of periodic event should occur, and the time period that should elapse between two successive occurrences of the periodic event. The time period (preceded by keyword every) is expressed in terms of days, hours, minutes, and seconds (just like a temporal interval). For instance, in order to specify an event that should be raised every 20 minutes, starting from 12:00am on Dec. 24, 2000, the designer defines the following rule:

```
<REQUEST_NODE ID="catchperiod">
    <NAME> Catch Period </NAME>
    <FILTER event_type="temporalperiodic">
        period="every 20:00 from 2000-12-24 00:00:00"
    </FILTER>
</REQUEST_NODE>
```

Embodiments of the present invention also allow the definition of an (optional) upper limit timestamp, preceded by keyword to in the period definition, that denotes a point in time from which no more periodic events are generated. For instance, the following expression:

period="every 20:00 from Dec. 24, 2001 00:00:00 to
   Dec. 25, 2001 00:00:00"

specifies that the request node wants to receive a periodic event every 20 minutes from 12:00am on Dec. 24, 2001 to 12:00am on Dec. 25, 2001.

Finally, embodiments of the present invention allow the specification of periodic events occurring at a specific time of the day, day of the month, or day of the year. These are defined analogously to a timestamp, where the coarser granularities are omitted. For instance, a node that captures events occurring on the 27th day of the month is specified as:

period="on 27 00:00:00"

Again, remind that a request node can receive only one event. To be able to receive the next periodic event, it must be fired again (for example, it can be inside a loop).

Capturing rules in accordance with the present embodiments are now described. Besides defining the event of interest by means of the filtering rule, a request node may also capture the value of event attributes into local process variables. For this purpose, the filtering rule is coupled with a capturing rule. For instance, assume that in the candidate interview process, the designer also wants to capture, from Candidate Withdrawal events, the reason why the candidate canceled the job application.

When filtering this event in the event request, an interview process instance is not interested in the reason of the cancellation: events of interest are all those events that are related to the person and the position for which the process is scheduling the interview, regardless of the cancellation reason. However, when the event is received, the process needs to capture the cancellation reason for bookkeeping purposes (or possibly to propose higher compensations if the reason was that the candidate has received another offer).

Event parameters can be captured into process variables by specifying a set of pairs <process variable name, event attribute name>, meaning that the specified process variable takes the value of the specified event parameter as the event is delivered to the request node. The complete definition of a request node interested in candidate withdrawals including the capturing rule-is therefore as follows:

```
<REQUEST_NODE ID="CandIdate_Withdrawal">
    <NAME> Candidate Withdrawal </NAME>
    <FILTER event_type="application-specific">
        event_name="Candidate Withdrawal" and
        candidate_name=$candidateName and
        position=$advertisedPosition
    </FILTER>
    <CAPTURE>
        <PAR_NAME> reason </PAR NAME>
        <VAR_NAME> candidate_cancellation_reason </VAR NAME>
    </CAPTURE>
</REQUEST_NODE>
```

Symbolic dates in accordance with the present embodiments are now described. In order to simplify the specification of temporal events, the present embodiments include the concept of symbolic date. Symbolic dates are keywords that identify a specific day or time. Examples of symbolic dates are Thanksgiving, Christmas, or Salary-Day. When defining instant or periodic events, process designer may use symbolic dates (prefixed by a double dollar sign) instead of actual time values. For example, the event "At Christmas 2001" may be defined as:

```
<REQUEST_NODE ID="At_Christmas">
    <NAME> At Christmas </NAME>
    <FILTER event_type="temporal_instant">
        timestamp=2001-$$Christmas
    </FILTER>
</REQUEST_NODE>
```

Note that in general, symbolic dates may identify a time of the day, day of the month, or day of the year. For instance, "Christmas" specifies a day and a month. Hence, to specify a timestamp, the specification must be completed by defining the values for the other time granularities. Instead, the specification needs not be completed to specify periodic events. In fact, a way to define request expression capturing periodic events is exactly that of specifying a timestamp without the coarser granularities. Hence, the event "every Christmas" can be specified as:

```
<REQUEST_NODE ID="EveryChristmas">
    <NAME> Every_Christmas <NAME>
    <FILTER event_type="temporalperiodic">
        period= "on $$Christmas"
    </FILTER>
</REQUEST_NODE>
```

The Christmas symbolic date is simply an easier and user-friendlier way to define a time or time period. However, the power of symbolic dates goes beyond this syntactical rewriting. For example, assume that process designers need to model process fragments to be executed every Thanksgiving. The way to specify this behavior would be to define a request node that waits until Thanksgiving before firing the subsequent nodes. Without symbolic dates, all process designers that need to define such a request node would have to compute the date corresponding to the next Thanksgiving and define the node accordingly. In addition, every year the definition of the request node would have to be updated. By using the symbolic date "Thanksgiving", it is the system who takes care of computing and maintaining the correct date year after year.

In addition to predefined symbolic dates, users can define their own symbolic dates. This is useful since many symbolic dates have meaning within a given company or community. For instance, the salary payday is typically company-specific. The definition of process fragments activated on these dates is very difficult without symbolic dates, since such dates may not have a clearly defined "formula" such as in the Thanksgiving example. On the contrary, they may vary and they may even be undefined at process definition time. However, by using symbolic dates, request nodes can be easily defined and maintained, since it is the system who will take care of delivering the events when appropriate.

Users can create new symbolic dates by specifying the symbolic date name and the timestamps in which a symbolic dates occurs. Timestamps can be specified in two ways:
1. As a periodic event. For instance, symbolic date Christmas can be specified as "on 12-25".
2. As a list of timestamps. This is the approach that would be followed, for instance, in the salary payday example. The list can be initially defined and later updated as the need arises.

Figure 6:
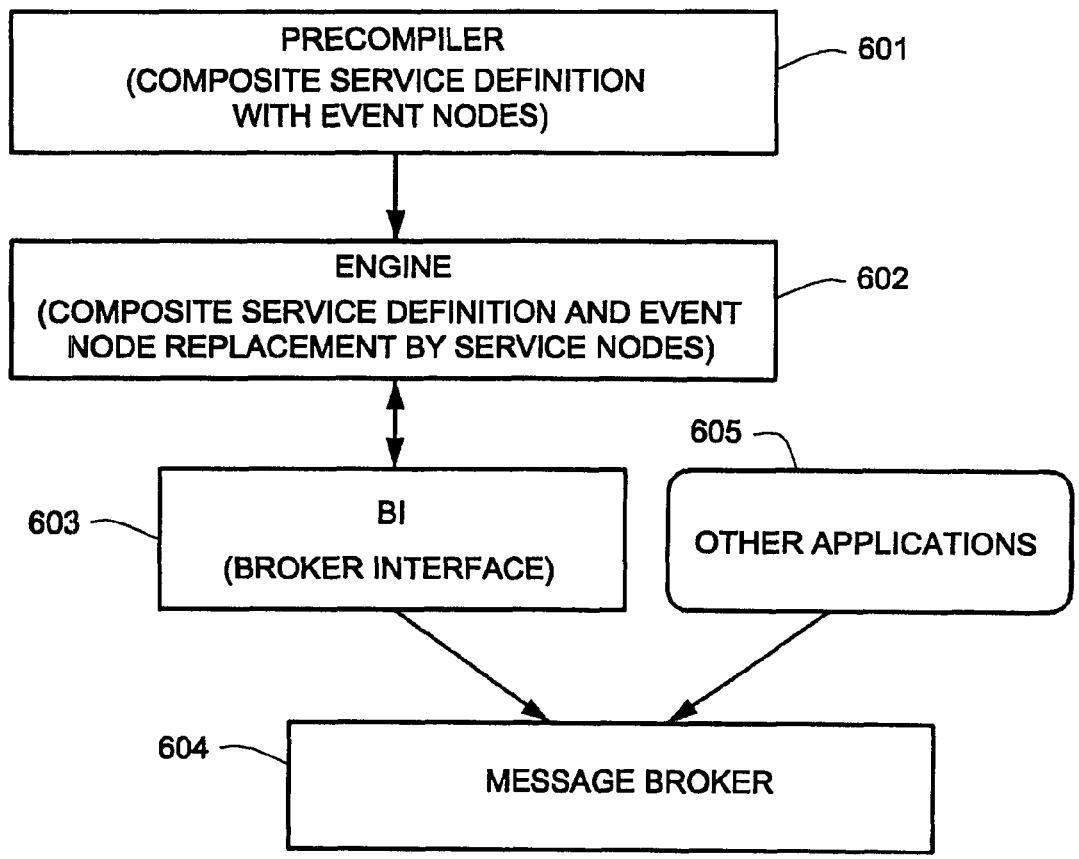
FIG. 6 shows a broker interface architecture in accordance with one embodiment of the present invention.

Referring now to FIG. 6, an architecture 600 in accordance with embodiments of the present invention are now described, specifically, the architecture that integrates the above-mentioned event management functionality into the composite services management. Preferably, event nodes are implemented by reusing the main process management functionality, i.e., that of selecting and invoking e-services. Composite service definition are processed by a precompiler 601 that replaces publish and request nodes with ordinary service nodes, assigned for execution to a specific service, called a Broker Interface (BI) 603. The generated service nodes will include all the parameters necessary to the BI 603 to process the event publication or request. In particular, the BI 603 will receive the XML string defining the node as well as the value of all process variables included in it, needed in order to appropriately filter or publish the event.

Event dispatching is managed by a message broker 604. There are a number of message brokers available on the market that provide publish-subscribe functionality (e.g., WebMethods Enterprise, STC eGate, or BEA eLink) required by embodiments of the present invention. Hence, existing messaging platforms can optionally be used.

The BI 603 acts as the link between the management engine 602 and the message broker 604. When a publish node is scheduled by the management engine 602, management engine 602 realizes that it has to invoke the BI 603 (as specified in the service node definition generated by the precompiler), thereby providing the XML definition of the publish node and the specified process variables as parameters. The BI 603 then prepares (from the XML definition of the publish node and from the received process variables) the actual event to be published, connects to the message broker, and publishes the event.

Referring still to FIG. 6, event requests are instead processed by subscribing to the event of interest with the message broker. When a request node is scheduled by the engine 602, engine 602 invokes the BI 603, providing it with the definition of the request node (and in particular of the filtering expression). The BI 603 then subscribes with the message broker 604 for events that satisfy the filter. When such an event is published by the broker 604 (either generated by management engine 602 or by other applications 605) the BI 603 extracts the parameters of interest as specified in the capturing rule and returns them to the process engine 602, that in turn updates the process variables of the requesting process instance.

One difference for this scheme comprises requests for temporal events. The problem is that these events are not generated by the engine 602 or by other applications 605. Hence, besides subscribing to the event (just like for any other event request), the BI 603 also takes care of generating the event when appropriate. The BI 603 computes, from the request node definition, the timestamp at which the request node wants to be notified. Then it sets up an alarm. When the alarm expires, it publishes an event with the timestamp, so that it will be received (due to the previous subscription) and delivered to the requesting node.

Figure 7:
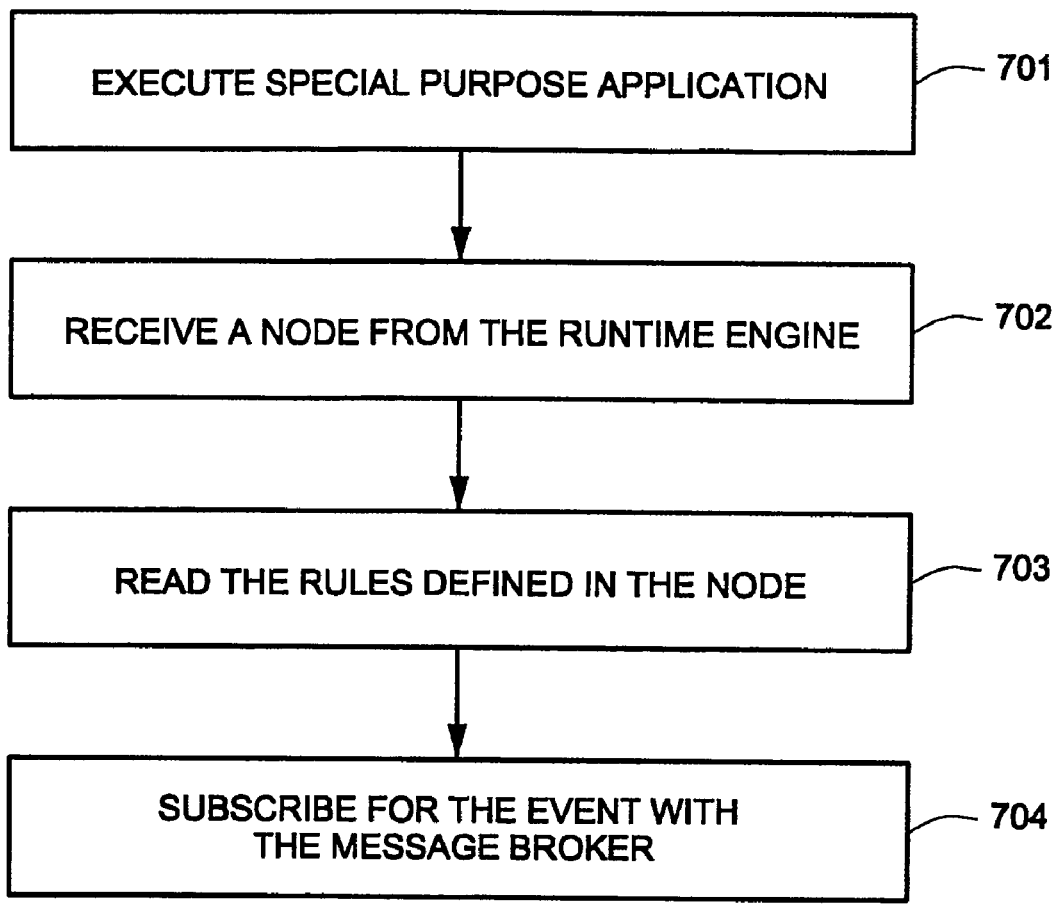
FIG. 7 shows a flow chart of the steps performed by a special purpose application in accordance with one embodiment of the present invention.

FIG. 7 shows a flow chart of the steps performed by a special purpose application in accordance with one embodiment of the present invention. As described above, events generated by certain special purpose applications (e.g., other applications 605) cause the BI 603 to extract the parameters of interest and update the process variables of the requesting process instance. The special purpose application subscribes to the BI 603 to obtain these updates. FIG. 7 describes this process.

In step 701, a special purpose application is executed. This application can be configured to accomplish a specialized function, for example, some function not usually encountered during a management process execution (e.g., notifying security, etc.). In step 702, the special purpose application receives a node from the runtime engine (e.g., the engine 602 from FIG. 6). In step 703, the application reads the rules defined in the node. Subsequently, in step 704, the special purpose application subscribes for the event with the message broker 604.

Thus, embodiments of the present invention are directed towards a method and system for offloading execution and resources for resource constrained network devices. Embodiments of the present invention provide a comprehensive model and architecture that enables the delivery of value-added E-business services, by extending service composition models with a rich, flexible, and easy to use event mechanism. Embodiments of the present invention provide a solution that supports the specification, deployment, and management of composite e-services, i.e., of e-services that are carried out by invoking several other basic or composite services. Embodiments of the present invention provide a solution that provides the service developer with a simple, easy to use, yet powerful mechanism for defining services by composing basic ones. Additionally, embodiments of the present invention provide a solution that supports the dynamic modification of service definitions while they are under operation, as required for businesses to be operated in dynamic environments such as that of Internet-based e-service communities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. An event management method for a computer implemented business process management system, the method comprising:

representing, by a computer, a business process as a collection of nodes that include event nodes, decision nodes, and service nodes, wherein the event nodes define points in a progress of the business process for communicating with an external process to exchange information, the decision nodes specify alternatives and rules controlling execution flow of the business process, and the service nodes represent invocation of services;

replacing, by the computer, at least a subset of the event nodes with replacement service nodes, wherein the replacing is performed by a precompiler, wherein the subset of event nodes include a publish event node and a request event node, wherein the publish event node is for publishing a corresponding event, and wherein the request event node is for waiting for a corresponding event to occur, and wherein at least one of the replacement service nodes corresponding to the publish event node invokes a publish service and at least one of the replacement service nodes corresponding to the request event node invokes a request service;

executing, by the computer, the business process by progressive execution through the collection of nodes, wherein the executing comprises:
upon encountering one of the replacement service nodes, invoking a particular service according to a definition of the one replacement service node, and
the particular service interacting with a broker that manages publication of events.

2. The method of claim 1 further including the step of defining at least one of events corresponding to the event nodes to include a symbolic date.

3. The method of claim 1 wherein the request event node is for requesting information from the corresponding event or for synchronizing execution with the corresponding event.

4. The method of claim 3 wherein the request event node is a blocking node for blocking the execution of the business process until the requested information is provided.

5. The method of claim 3 wherein the request event node is a symbolic date request node having a non-fixed calendar date of occurrence.

6. The method of claim 1 wherein the event nodes are specified using an XML syntax.

7. The method of claim 1, further comprising assigning the replacement service nodes for execution to the service that includes a broker interface, wherein the replacement service nodes include parameters for the broker interface to process event publication or request.

8. The method of claim 7, wherein the broker interface provides a link to the broker, and wherein if the encountered one replacement service node corresponds to the request event node, the broker interface subscribes with the broker for an event that satisfies a filtering expression of the request event node.

9. The method of claim 7, wherein if the encountered one replacement service node corresponds to the request event node, and wherein if the request event node is a request for a temporal event, the broker interface generates a timestamp based on a definition of the request event node, the timestamp indicating a time at which the request event node wants to be notified.

10. A computer readable media for use with a digital computer system, the computer readable media having computer readable instructions stored thereon which when executed by the computer system cause the computer system to implement an event management method for a computer implemented business process system, the method comprising:
representing a business process as a collection of event nodes, decision nodes, and service nodes, the event nodes defining points in a progress of the business process for communicating with an external process to exchange information, wherein the decision nodes specify alternatives and rules controlling execution flow of the business process, and wherein the service nodes represent invocation of services;
replacing at least a subset of the event nodes with replacement service nodes, wherein the replacing is performed by a precompiler, wherein the subset of event nodes include a publish event node and a request event node, wherein the publish event node is for publishing a corresponding event, and wherein the request event node is for waiting for a corresponding event to occur, and wherein at least one of the replacement service nodes corresponding to the publish event node invokes a publish service and at least one of the replacement service nodes corresponding to the request event node invokes a request service; and executing the business process by sequentially executing through the collection of nodes, wherein the executing comprises:
upon encountering one of the replacement service nodes, invoking a particular service according to a definition of the one replacement service node, and
the particular service interacting with a broker that manages publication of events.

11. The computer readable media of claim 10 wherein the request event node is for requesting information from at least one of a plurality of events.

12. The computer readable media of claim 11 wherein the request event node is a blocking node for blocking the execution of the business process until the requested information is provided.

13. The computer readable media of claim 11 wherein the request event node is a symbolic date request node having a non-fixed calendar date of occurrence.

14. The computer readable media of claim 10 wherein the computer implemented business process system is an XML (extensible markup language) based business process system.

15. The computer readable media of claim 10, wherein the method further comprises assigning the replacement service nodes for execution to the service that includes a broker interface, wherein the replacement service nodes include parameters for the broker interface to process event publication or request.

16. The computer readable media of claim 15, wherein the broker interface provides a link to the broker, and wherein if the encountered one replacement service node corresponds to the request event node, the broker interface subscribes with the broker for an event that satisfies a filtering expression of the request event node.

17. The computer readable media of claim 15, wherein if the encountered one replacement service node corresponds to the request event node, and wherein if the request event node is a request for a temporal event, the broker interface generates a timestamp based on a definition of the request event node, the timestamp indicating a time at which the request event node wants to be notified.

18. A business process system for implementing event management for business process, comprising:
a computer system having a processor for executing computer readable code; and
a memory coupled to the computer system storing computer readable code which when executed by the computer system cause the computer system to implement an event management method for a business process, the method comprising:
representing a business process as a collection of event nodes, decision nodes, and service nodes, the event nodes defining points in a progress of the business process for communicating with an external process to exchange information, wherein the decision nodes specify alternatives and rules controlling execution flow of the business process, and wherein the service nodes represent invocation of services;
replacing at least a subset of the event nodes with replacement service nodes, wherein the replacing is performed by a precompiler, wherein the subset of event nodes include a publish event node and a request event node, wherein the publish event node is for publishing a corresponding event, and wherein the request event node is for waiting for a corresponding event to occur, and wherein at least one of the replacement service nodes corresponding to the publish event node invokes a publish service and at least one of the replacement service nodes corresponding to the request event node invokes a request service; and executing the business process by sequentially executing through the collection of nodes, wherein the executing comprises:

upon encountering one of the replacement service nodes, invoking a particular service according to a definition of the one replacement service node, and the particular service interacting with a broker that manages publication of events.

19. The system of claim 18 wherein an event corresponding to one of the event nodes includes a symbolic date.

20. The system of claim 18 wherein the request event node is for requesting information from at least one of a plurality of events or for synchronizing execution with at least one of the plurality of events.

21. The system of claim 20 wherein the request event node is a blocking node for blocking the execution of the business process until the requested information is provided.

22. The system of claim 20 wherein the request event node is a symbolic date request node having a non-fixed calendar date of occurrence.

23. The system of claim 18 wherein the event nodes are defined using an XML syntax.

24. The system of claim 18, wherein the computer readable code when executed cause the computer system to further assign the replacement service nodes for execution to the service that includes a broker interface, wherein the replacement service nodes include parameters for the broker interface to process event publication or request.

25. The system of claim 24, wherein the broker interface provides a link to the broker, and wherein if the encountered one replacement service node corresponds to the request event node, the broker interface subscribes with the broker for an event that satisfies a filtering expression of the request event node.

26. The system of claim 24, wherein if the encountered one replacement service node corresponds to the request event node, and wherein if the request event node is a request for a temporal event, the broker interface generates a timestamp based on a definition of the request event node, the timestamp indicating a time at which the request event node wants to be notified.

* * * * *